June 9, 1953 W. L. KENNICOTT 2,641,049
TOOLHOLDER
Filed Jan. 13, 1949
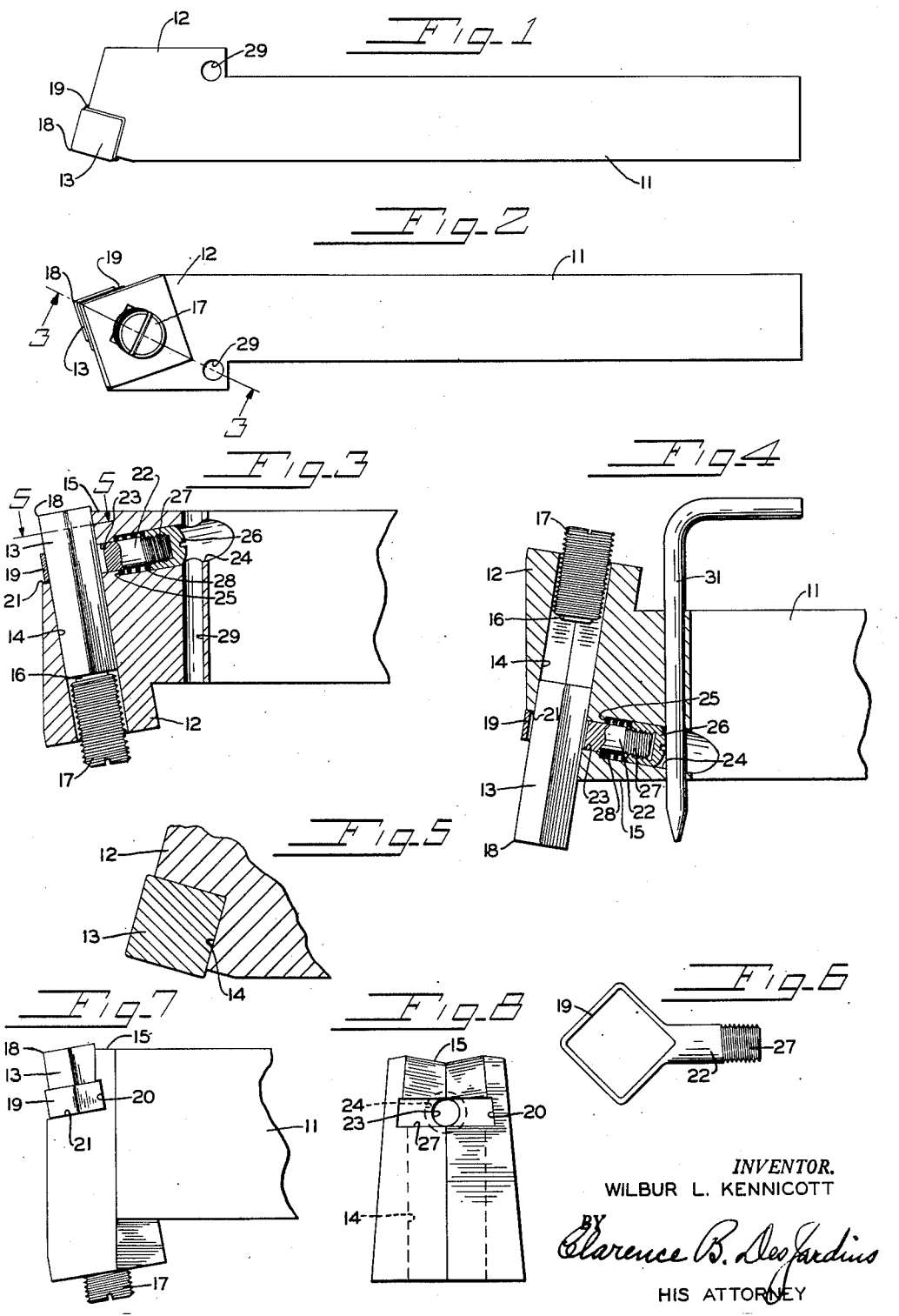
INVENTOR.
WILBUR L. KENNICOTT
BY Clarence B. Desjardins
HIS ATTORNEY Patented June 9, 1953

2,641,049

UNITED STATES PATENT OFFICE 2,641,049

TOOLHOLDER

Wilbur L. Kennicott, Unity Township, Westmoreland County, Pa., assignor to Kennametal Inc., Latrobe, Pa., a corporation of Pennsylvania Application January 13, 1949, Serial No. 70,634

10 Claims. (Cl. 29—96)

This invention relates to a machine tool holder for a cutting insert and particularly concerns a holder having a releasable clamp for securing the cutting insert in position.

Cutting machines, such as metal lathes, usually have a tool post for securing a cutting insert holder in position so the insert in the holder will perform the desired cutting operation. To hold the cutting insert, the holder has a recess, extending either longitudinally or laterally with respect to the shank by which the holder may be secured in the post. In some types of holders, an adjustable abutment, in the form of an adjustable bolt, is arranged in the end of the recess to engage the non-cutting end of the insert in the recess and thereby adjust the position of the cutting insert longitudinally of the recess. To secure the insert in the recess, some holders utilize a set screw and others compress the walls of the recess toward each other, as by suitable bolts, for exerting a clamping pressure on the insert.

In both types of clamping devices, to either adjust the cutting insert longitudinally of the recess, or to replace the insert in the recess, it has heretofore been necessary to loosen the bolts clamping the insert in place in the recess. The clamping bolts extend outwardly from one side of the holder, and since a plurality of holders are frequently placed side by side in a machine, access to the bolts for adjustment is difficult, or impossible if adjacent holders are in close proximity. Moreover adjustment of the bolts is time consuming, particularly where frequent adjustments of the cutting bit are necessary during a cutting operation.

It is a major object of this invention to provide a cutting insert holder in which the insert is retained in a recess by an easily releasable and readily accessible clamp. More specifically, the purpose of the invention is to provide a clamp which requires only a simple manipulation to release the cutting insert from the recess of the holder.

Another object of the invention is to provide a cutting insert holder in which the insert is retained in position by resiliently applied pressure of a clamp so the insert may be adjusted longitudinally of its recess without releasing the clamp.

Another object of the invention is to provide a cutting insert holder providing access to the clamp from the top or bottom of the holder so that it can be readily adjusted irrespective of how closely any number of these holders may be arranged side to side.

In the case of cutting insert holders for hard carbide cutting inserts, it is necessary to provide adequate support for the insert in the direction of the cutting thrust. It is a further important object of the invention to provide a cutting insert holder affording adequate support for a hard carbide cutting insert and in which the cutting insert may be removed by a simple manual manipulation.

In accordance with these objects, one important feature of the invention resides in the arrangement of a spring pressed clamp to retain the insert in a recess having an adjustable abutment acting on the end of the insert to exert cutting thrust. Another feature of the invention resides in the provision of a release member for the spring pressed clamp which may be manipulated by manual pressure to permit removal of the insert. By using a spring pressed clamp to retain the cutting insert in the recess by resiliently applied pressure sufficient to normally hold the insert and still permit longitudinal movement thereof, the insert may be adjusted longitudinally of the recess without the necessity of releasing the clamp as has been the case in previously developed insert holders. The spring pressure exerted by the clamp is in the same direction as the cutting thrust to hold the insert against those walls of the holder which support the insert against cutting thrust.

Other objects and advantages of the invention will become apparent from the following specification taken in connection with the accompanying drawings, wherein like parts are identified by the same reference numerals in the several views, and sectional views are taken in the direction of the arrows on the section line:

Fig. 1 is a top plan view of a cutting insert holder embodying the invention in its preferred form;

Fig. 2 is a bottom view of the cutting insert holder shown in Fig. 1;

Fig. 3 is a vertical section taken through the cutting insert holder on the line 3—3 of Fig. 2;

Fig. 4 is a view similar to Fig. 3, but showing the releasing tool inserted and the clamp actuated to its release position to permit removal of the cutting insert;

Fig. 5 is a cross-section taken on the line 5—5 of Fig. 3;

Fig. 6 is a plan view of the clamping member shown in Figs. 3 and 4;

Fig. 7 is a partial side elevation of the cutting insert holder shown in Fig. 1; and Fig. 8 is a front elevation of the cutting insert holder with the cutting insert and the clamp removed.

In accordance with the preferred form of the invention, the cutting insert holder has a shank which is adapted to be inserted and held in a tool post on a cutting machine. At one end of the shank the cutting insert holder has a head provided with a recess extending from a face of the head in a direction generally lateral to the shank. The bottom of the recess, opposite the open face end, is closed by an adjustable abutment which may be in the form of a set screw threaded in the bottom portion of the recess and accessible at the bottom of the head. The recess has a shape adapted to enclose a cutting insert therein, and the abutment serves as a base for adjusting the cutting insert within the recess and holding same in adjusted position therein with that portion or portions of the wall of the recess, remote from the front end of the head of the holder, supporting the cutting insert against cutting thrust.

To retain the cutting insert within the recess, there is provided a spring pressed clamp arranged to force the cutting insert toward the thrust supporting side or sides of the recess. This clamp may be in the form of a band, having generally the same shape as the recess, and arranged on a ledge or shelf, formed by cut away portions of the side wall, near the top, adjacent the upper face of the head and opposite the shank of the holder. The cutting element may be released by manipulation of a release member to act against the force of the spring and relieve the clamping pressure on the cutting element. This release member may be in the form of a neck extending laterally from the band surrounding the cutting insert and projecting into a hole formed in the head. One particularly desirable arrangement is for the hole to have an enlarged portion to form a shoulder in the hole and accommodate a cap on the neck preferably adjustable by being screw-threaded. A compression spring arranged between the shoulder and the cap exerts pressure on the neck and the clamping band to force the cutting insert toward the thrust supporting side or sides of the recess. This cap is below the outside surface of the head but accessible through an aperture in the head so pressure, applied to the cap, acts against the force of the spring, and relieves clamping pressure on the cutting insert, permitting it to be removed from the recess. As the resilient clamping pressure applied by the band permits the insert to be moved by force longitudinally of the recess, the cutting insert may be positioned by adjustment of the abutment without the necessity of releasing the clamp.

Referring now to the embodiment of the invention shown in the accompanying drawings, the cutting insert holder has a shank 11, generally rectangular in cross-section, and elongated so it may be accommodated in the tool post on a conventional cutting machine, such as a metal lathe. At one end of the shank 11, the cutting insert holder has a head 12, of somewhat larger transverse dimensions than the shank 11, for holding a cutting insert 13. To receive the cutting insert 13, the head 12 is provided with a recess 14, extending inwardly from upper face 15 of the head 12, and preferably sloping downwardly and inwardly toward the shank 11 at an angle of about 10° with respect to the shank. The cross-sectional shape of the recess 14 corresponds to the cross-sectional shape of the cutting insert 13. In the example shown in the drawing, the cutting insert 13 is of square cross-sectional shape but could be of any conformation, and the recess 14 is of the same shape to enclose a cutting insert placed therein. It is important that the walls of the recess 14 fit quite closely to the sides of the cutting insert, particularly where the cutting insert is made of a cemented hard carbide composition to provide lateral support for the insert. Cutting thrust for the cutting insert 13, is provided by those wall portions of the recess which are remote from the front end of the holder against which the insert rests when the tool is in use. The abutment 16 at the lower end of the recess 14 bears against the bottom of the cutting insert 13 and holds same in adjusted position to rest upon the thrust supporting wall portions of the recess. Preferably, this abutment 16 may be adjusted longitudinally of the recess by turning a set screw 17. As shown in the drawings, the abutment 16 comprises the end of the set screw 17 which is threaded in the lower end of the recess 14, to adjust the cutting insert 13 longitudinally of the recess, and thereby adjust the position of cutting edge 18 of the cutting insert 13 with respect to the face 15 of the head 12.

With a cutting insert positioned in the recess 14 and enclosed by the side walls of the recess with slight clearance for about .005 to .010 inch play, the cutting insert holder may be placed in the tool post of the cutting machine. The tool may then be used to perform desired cutting operations, cutting thrust being provided by those portions of the recess walls against which the cutting insert rests by reason of the fit of the side walls of the recess about the sides of the cutting insert, as shown most clearly in Fig. 5.

With an arrangement such as has been described, it is unnecessary, for the cutting operation, to tightly clamp the cutting insert 13 in the recess 14. During actual cutting, pressure on the cutting edge 18 forces the cutting insert 13 against the back wall portions of the recess upon which it is supported in the position to which same has been adjusted by abutment 16.

In order to retain the cutting insert 13 in the recess 14 when the tool is being handled or adjusted between cutting operations, a retainer is provided in the form of a spring pressed clamp acting on the cutting insert 13 to force it against the walls of the recess and prevent it from being accidentally removed from the recess. This spring pressed clamp is shown in the form of a band 19 shaped to correspond to the cross-sectional shape of the recess 14 so, when it is aligned with the recess 14, it will surround the cutting insert 13. To accommodate this clamping band 19, portions of the side walls of the recess adjacent the face 15, and opposite the shank 11, are removed to form a ledge or shelf 21 below the face 15 and extending around the two exposed sides of the cutting insert 13. Also, to accommodate the band 19, the unremoved portions of the side walls are formed with channel 20 in line with shelf 21. The clamping band 19 is in the channel 20 and on the shelf 21 to surround the recess and the cutting bit 13. For a reason which will hereinafter appear, it is desirable that the internal dimensions of the band 19 be slightly greater than those of the recess 14 or the cutting insert 13.

To provide spring pressure on the clamping band 19, the band has attached to one corner, a neck 22, extending laterally from the band into a hole 23, bored into the head 12, transversely from the recess 14. The hole 23 has a portion 24, of larger diameter, to provide a shoulder 25 between the two ends of the hole. The enlarged portion 24 accommodates a cap 26, which may be fastened to the end of the neck 22, as by threads 27. Arranged between the shoulder 25 and the cap 26 is a compression spring 28, surrounding the neck 22, and exerting pressure on the cap to force the band 19 transversely of the recess 14 in the general direction of the shank 11. Thus, cutting insert 13 is clamped by the pressure of spring 28 toward the rear side walls of the recess and is thereby prevented from being accidentally removed from the recess.

Cap 26 on the end of the neck 22 is accessible through an aperture 29, formed in the head 12, so pressure may be manually applied to the end of the cap 26 to compress the spring 28 and thereby relieve clamping pressure of the band 19 on the cutting insert 13. To apply this pressure on the cap 26, a releasing tool, such as that shown at 31 in Fig. 4, may be inserted through the aperture 29 so it engages the cap 26 and forces the cap toward the recess 14, thereby compressing the spring 28 and shifting the clamping band 19 transversely of the recess to relieve clamping pressure on the cutting insert 13. Inasmuch as the internal dimensions of the clamping band 19 are slightly greater than the external dimensions of the cutting insert 13, the slight shifting movement of the clamping band by the application of pressure to the cap 26 is sufficient to remove the outer sides of the band 19 from the faces of the cutting insert 13, but is insufficient to engage the inner sides of the band 19 with the inner surfaces of the cutting insert 13.

Summarizing, the cutting bit holder has a shank with a head at one end having a recess 14 extending from a face 15 of the head to accommodate and enclose cutting bit 13. An adjustable abutment 16 is positioned in the bottom of the recess to vary the position of cutting edge 18 of the cutting bit relative to the face 15. Clamping band 19 surrounds the cutting bit 13 and spring 28 exerts pressure through cap 26 and neck 22 to force the band against the sides of the cutting insert and thereby clamp the cutting insert against the sides of the recess. Longitudinal adjustment of the cutting insert 13 in the recess may be effected by turning screw 17 to adjust the position of abutment 16 without the necessity of relieving the clamping pressure on clamping band 19, because the clamping band 19 is resiliently held against the surfaces of the cutting insert 13 by a pressure sufficient to hold the cutting insert retained in the recess, while permitting the cutting insert to be forced longitudinally of the recess, as by adjustment of the screw 17. When it is desired to remove the cutting insert 13 from the recess, a tool 31 may be inserted in aperture 29 to apply pressure to cap 26, thereby compressing spring 28 and relieving clamping pressure of band 19 on the cutting insert 13.

I am aware that the device shown and described herein is susceptible of considerable variation without departing from the spirit of my invention and, therefore, I claim my invention broadly as indicated by the appended claims.

Having thus described my invention, what I claim as new and useful, and desire to secure by Letter Patent, is:

1. A holder for a cutting insert comprising a shank adapted to be held by the tool post on a cutting machine, a head at one end of said shank, said head being formed with a recess extending inwardly from one face for receiving a cutting insert, an abutment at the bottom of said recess adjustable longitudinally thereof for adjusting the position of a cutting insert in the recess to position its cutting edge with respect to said face, and a spring pressed clamp carried by said head adjacent said recess in position to engage the cutting insert for releasably securing said cutting insert in the recess.

2. A cutting insert holder as defined by claim 1 wherein the releasing tool receiving recess opens out through different sides of the holder.

3. A holder for a cutting insert comprising a shank adapted to be held by the tool post on a cutting machine, a head at one end of said shank, said head being formed with a recess extending inwardly from one face for receiving a cutting insert, an abutment at the bottom of said recess spaced from said face and adjustable longitudinally of said recess to position the cutting edge of the cutting insert with respect to said face, a spring pressed clamp carried by said head adjacent said recess in position to engage the cutting insert for releasably securing said cutting bit in the recess, and a releasing member for moving said clamp against the force of its spring to release and permit removal of a cutting insert from said recess.

4. A cutting insert holder as defined by claim 3 wherein the releasing tool receiving recess opens out from different sides of the holder.

5. A holder for a cutting insert comprising a shank adapted to be held by the tool post of a cutting machine, a head at one end of said shank, said head being formed with a recess extending inwardly from a face of said head and shaped to snugly enclose a cutting insert insertable in the recess, a portion of the side walls of said recess adjacent said face being removed opposite said shank to form a ledge partly around the recess, a band corresponding in cross-section to said recess and aligned therewith at said ledge to surround a cutting insert in the recess, a spring-receiving portion on the band extending into a socket terminating in a releasing tool receiving recess opening through different sides of the holder, and spring means mounted on the spring-receiving portion for acting on said band to force it transversely of said recess for clamping a cutting insert therein.

6. A cutting insert holder as defined in claim 5 wherein said recess and said band are polygonally shaped to accommodate a cutting insert of polygonal cross-section.

7. A holder for a cutting insert comprising a shank adapted to be held by the tool post on a cutting machine, a head at one end of said shank, said head being formed with a recess extending inwardly from a face of said head and shaped to snugly enclose a cutting insert insertable in the recess, a portion of the side walls of said recess adjacent said face being removed opposite said shank to form a ledge partially around the recess, a band corresponding in cross-section to said recess and aligned therewith at said ledge to surround a cutting insert in the recess, a neck on said band extending laterally into a hole formed in said head extending from said recess toward said shank and terminating in a releasing tool receiving recess opening through at least one side of the holder, and a spring acting on said neck to force said band transversely of said recess for clamping a cutting insert therein.

8. A cutting insert holder as defined in claim 7 wherein said neck is accessible through the releasing tool receiving recess opening through different sides of holder so the neck may be moved against the action of said spring to release said band from a cutting insert in said recess.

9. A holder for a cutting insert comprising a shank adapted to be held by the tool post on a cutting machine, a head at one end of said shank, said head being formed with a recess extending inwardly from a face of said head and shaped to snugly enclose a cutting insert inserted in the recess, a portion of the side walls of said recess adjacent said face being removed opposite said shank to form a ledge partially around the recess, a band corresponding in cross-section to said recess and aligned therewith at said ledge, a neck on said band extending laterally into a hole from said recess toward said shank and terminating in a releasing tool receiving recess opening through at least one side of the holder, said hole having an enlarged portion spaced from said recess to form a shoulder, a cap on said neck, and a spring interposed between said cap and said shoulder to force the neck of said band transversely of said recess for clamping a cutting insert therein.

10. A cutting insert holder as defined in claim 9 wherein said cap is accessible through the releasing tool receiving recess opening in from different sides of holder to move the cap and the band and thereby release the band from a cutting insert in the recess.

WILBUR L. KENNICOTT.

References Cited in the file of this patent

UNITED STATES PATENTS

| Number | Name | Date |
|---|---|---|
| 77,219 | Rundlett | Apr. 28, 1868 |
| 313,739 | Ives | Mar. 10, 1885 |
| 318,718 | Gibson | May 26, 1885 |
| 838,638 | McKay | Dec. 18, 1906 |
| 954,049 | Quast | Apr. 5, 1910 |
| 2,021,668 | Miller | Nov. 19, 1935 |
| 2,349,189 | Murray | May 16, 1944 |

FOREIGN PATENTS

| Number | Country | Date |
|---|---|---|
| 27,802 | Great Britain | Sept. 3, 1914 |
| 455,550 | France | May 27, 1913 |
| 549,892 | Great Britain | Dec. 11, 1942 |